United States Patent
Ye et al.

(10) Patent No.: US 10,897,692 B2
(45) Date of Patent: Jan. 19, 2021

(54) SERVICE PROCESSING METHOD, SERVICE PROCESSING APPARATUS, AND STORAGE MEDIUM

(71) Applicant: Tencent Technology (Shenzhen) Company Limited, Shenzhen (CN)

(72) Inventors: Wa Ye, Shenzhen (CN); Zhouwei Zhu, Shenzhen (CN); Yadi Xiao, Shenzhen (CN); Zeqi Lian, Shenzhen (CN); Zhiping Su, Shenzhen (CN); Mengsha Zhou, Shenzhen (CN); Jiongchao Lin, Shenzhen (CN); Zhenyu Xu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 322 days.

(21) Appl. No.: 15/725,114

(22) Filed: Oct. 4, 2017

(65) Prior Publication Data

US 2018/0035240 A1 Feb. 1, 2018

Related U.S. Application Data

(63) Continuation-in-part of application No. PCT/CN2016/097388, filed on Aug. 30, 2016.

(30) Foreign Application Priority Data

Sep. 29, 2015 (CN) .......................... 2015 1 0631911

(51) Int. Cl.
*G06Q 30/02* (2012.01)
*H04W 4/60* (2018.01)
(Continued)

(52) U.S. Cl.
CPC .......... *H04W 4/60* (2018.02); *G06Q 30/0255* (2013.01); *G06Q 30/0267* (2013.01);
(Continued)

(58) Field of Classification Search
USPC ............................................ 705/14.16, 14.26
See application file for complete search history.

(56) References Cited

U.S. PATENT DOCUMENTS

| 2012/0316938 | A1* | 12/2012 | Moshfeghi | G06Q 30/02 705/14.16 |
| 2013/0006738 | A1* | 1/2013 | Horvitz | G06O 30/0207 705/14.16 |
| 2015/0254704 | A1* | 9/2015 | Kothe | G06Q 30/06 705/14.26 |

FOREIGN PATENT DOCUMENTS

| CN | 103250394 A | 8/2013 |
| CN | 104285234 A | 1/2015 |

(Continued)

OTHER PUBLICATIONS

Tencent Technology, ISRWO, PCT/CN2016/097388, dated Nov. 24, 2016, 9 pgs.

(Continued)

*Primary Examiner* — Afaf Osman Bilal Ahmed
(74) *Attorney, Agent, or Firm* — Morgan, Lewis & Bockius LLP

(57) ABSTRACT

A service processing method includes: presenting predefined services on a service usage interface of a first application; obtaining, from a backend server of the third-party service provider, notification information that a first service presented on the service usage interface has been used, updating the predefined services on the service usage interface, and presenting an information prompt identifier corresponding to the first service; and detecting that the information prompt identifier corresponding to the first service is triggered, and (Continued)

in response to detecting that the information prompt identifier corresponding to the first service is triggered, presenting the notification information that the first service has been used and an information prompt identifier of a second service associated with the first service, the information prompt identifier of the second service being capable of prompting a user to add the second service to the service usage interface of the first application.

17 Claims, 12 Drawing Sheets

(51) Int. Cl.
*H04L 29/08* (2006.01)
*G06K 19/06* (2006.01)

(52) U.S. Cl.
CPC ......... *G06Q 30/0272* (2013.01); *H04L 67/36* (2013.01); *G06K 19/06037* (2013.01)

(56) References Cited

FOREIGN PATENT DOCUMENTS

| | | |
|---|---|---|
| CN | 104778585 A | 7/2015 |
| CN | 105357261 A | 2/2016 |
| JP | WO2014141665 A1 | 2/2017 |

OTHER PUBLICATIONS

Tencent Technology, IPRP, PCT/CN2016/097388, dated Apr. 3, 2018, 7 pgs.

* cited by examiner

SERVICE PROCESSING METHOD, SERVICE PROCESSING APPARATUS, AND STORAGE MEDIUM

PRIORITY CLAIM AND RELATED APPLICATION

This application is a continuation-in-part application of PCT/CN2016/097388, entitled "SERVICE PROCESSING METHOD AND SERVICE PROCESSING APPARATUS, AND STORAGE MEDIUM" filed on Aug. 30, 2016, which claims priority to Chinese Patent Application No. 201510631911.9, filed with the State Intellectual Property Office of the People's Republic of China on Sep. 29, 2015, and entitled "SERVICE PROCESSING METHOD AND SERVICE PROCESSING APPARATUS, AND STORAGE MEDIUM", both of which are incorporated herein by reference in their entirety.

FIELD OF THE TECHNOLOGY

The present disclosure relates to communications technologies, and in particular, to a service processing method, a service processing apparatus, and a storage medium.

BACKGROUND OF THE DISCLOSURE

Using applications running in mobile terminals (such as a smartphone and a tablet computer) becomes an important method used by users to obtain information. Currently, users can reserve and use various services based on applications running in mobile terminals (for example, shop online, reserve take-out services, and reserve services such as cleaning and housekeeping by using applications in mobile terminals). Various forms of online services replace conventional offline services and become a new trend of service integration in the mobile Internet. However, it is difficult for a user to rapidly find a desired service during a process of reserving a service by using an application in a mobile terminal.

SUMMARY

A user may install various applications in a mobile terminal to reserve different forms of services. A backend server of a third-party service provider may periodically or from time to time push a service in which the user may be interested to a corresponding application in the mobile terminal, resulting in the following problems:

1. Because it cannot be ensured that a service included in pushed information is always desired by a user, service recommendation precision is low.

2. The user needs to frequently check whether the information pushing a service is normal communication (such as short message service communication and communication based on social applications) of the user, interfering normal communication of the user.

In conclusion, by means of related technologies, it is difficult to precisely and rapidly find a service desired by a user, and normal communication of a user that is based on a mobile terminal is interfered.

Embodiments of the present technology provide a service processing method, a service processing apparatus, and a storage medium, so as to efficiently and precisely determine a service required by a mobile terminal user.

Technical solutions of the embodiments of the present technology are implemented as follows:

According to a first aspect, an embodiment of the present technology provides a service processing method, the method including:

obtaining, from a backend server of a third-party service provider, predefined services of a first application, and presenting the predefined services by means of a service usage interface of the first application;

obtaining, from the backend server of the third-party service provider, notification information that a first service presented on the service usage interface has been used, updating the predefined services on the service usage interface, and presenting an information prompt identifier corresponding to the first service; and detecting that the information prompt identifier corresponding to the first service is triggered, and presenting the notification information that the first service has been used and an information prompt identifier of a second service associated with the first service, the information prompt identifier of the second service being capable of prompting a user to add the second service to the service usage interface of the first application.

According to a second aspect, an embodiment of the present technology provides a service processing apparatus, the service processing apparatus including:

a first obtaining unit, configured to: obtain, from a backend server of third-party service provider, predefined services of a first application, and present the predefined services by means of a service usage interface of the first application;

a second obtaining unit, configured to: obtain, from the backend server of third-party service provider, notification information that a first service presented on the service usage interface has been used, update the predefined services on the service usage interface, and present an information prompt identifier corresponding to the first service; and a first detection unit, configured to: detect that the information prompt identifier corresponding to the first service is triggered, and present the notification information that the first service has been used and an information prompt identifier of a second service associated with the first service, the information prompt identifier of the second service being capable of prompting a user to add the second service to the service usage interface of the first application.

According to a third aspect, an embodiment of the present technology provides a service processing apparatus, the service processing apparatus including:

a storage medium, configured to store computer executable instructions; and a processor, configured to execute the computer executable instructions stored in the storage medium, the computer executable instructions including:

obtaining, from a backend server of third-party service provider, predefined services of a first application, and presenting the predefined services by means of a service usage interface of the first application;

obtaining, from the backend server of third-party service provider, notification information that a first service presented on the service usage interface has been used, updating the predefined services on the service usage interface, and presenting an information prompt identifier corresponding to the first service; and detecting that the information prompt identifier corresponding to the first service is triggered, and presenting the notification information that the first service has been used and an information prompt identifier of a second service associated with the first service, the information prompt identifier of the second service being capable of prompting a user to add the second service to the service usage interface of the first application.

According to a fourth aspect, an embodiment of the present technology provides a storage medium, the storage medium storing executable instructions, and the executable instructions being used to execute the service processing method provided in the embodiments of the present technology.

In the embodiments of the present technology, after a user uses a service (set to a first service) on a service usage interface, an information prompt identifier of the first service is set. When the user triggers an operation of viewing the information prompt identifier, notification information that the first service has been used that is notified by a backend server of third-party service provider and a prompt identifier of a second service are both displayed.

The user is notified of that the first service has been used, and in addition, the second service is recommended to the user by means of the prompt identifier of the second service. There is no need to recommend the second service to the user by means of a dedicated pushing message, so as to avoid interfering normal communication of the user.

DESCRIPTION OF EMBODIMENTS

The present disclosure is further described in detail below with reference to the accompanying drawings and embodiments. It should be understood that, the specific embodiments described herein are merely intended for explaining the present disclosure, but are not for limiting the present disclosure.

Herein, a mobile terminal provided during implementation of the embodiments of the present technology is described with reference to the accompanying drawings. The mobile terminal may be implemented in various forms. For example, the mobile terminal may be a smartphone, a tablet computer, a notebook computer, or a wearable device (such as smartglasses or a smartwatch). An operating system of the mobile terminal may be an Android operating system, an iOS operating system, or an operating system (such as a mobile version of a Linux operating system or a Blackberry QNX operating system) that is developed by any other third party and that can run in a microcomputer structure (including at least a processor and a memory). In the accompanying drawings in the embodiments of the present technology, description is made by using an example in which the mobile terminal is a smartphone. This constitutes no limitation on a type of a mobile terminal to which the technical solutions described in the embodiments of the present technology are applicable.

A first application (the first application herein does not indicate a particular application, and is merely used to represent an application having a service obtaining function, where the service obtaining function may be provided as a particular functional module to be embedded in any application, such as a social application, that runs in the mobile terminal, or may be provided as a dedicated application for obtaining a service) that can obtain a service runs in the mobile terminal. In some embodiments, the first application is a social networking client application that provides social networking functions between users on a social network platform, such as instant messaging services, and content sharing services. In some embodiments, the first application also supports online shopping or reservation services using the social networking platform and instant messaging communication means. The service herein may be offline services (such as merchant coupons, vouchers, group-buying coupons, red envelopes, member cards, take-out services, cleaning services, and housekeeping services) packaged as services, or may be services (such as online game cards and online cinema tickets) that are used online, or may be services that combine online and offline services.

The embodiments of the present technology are provided based on the mobile terminal and the first application running in the mobile terminal that are described above.

Figure 1:
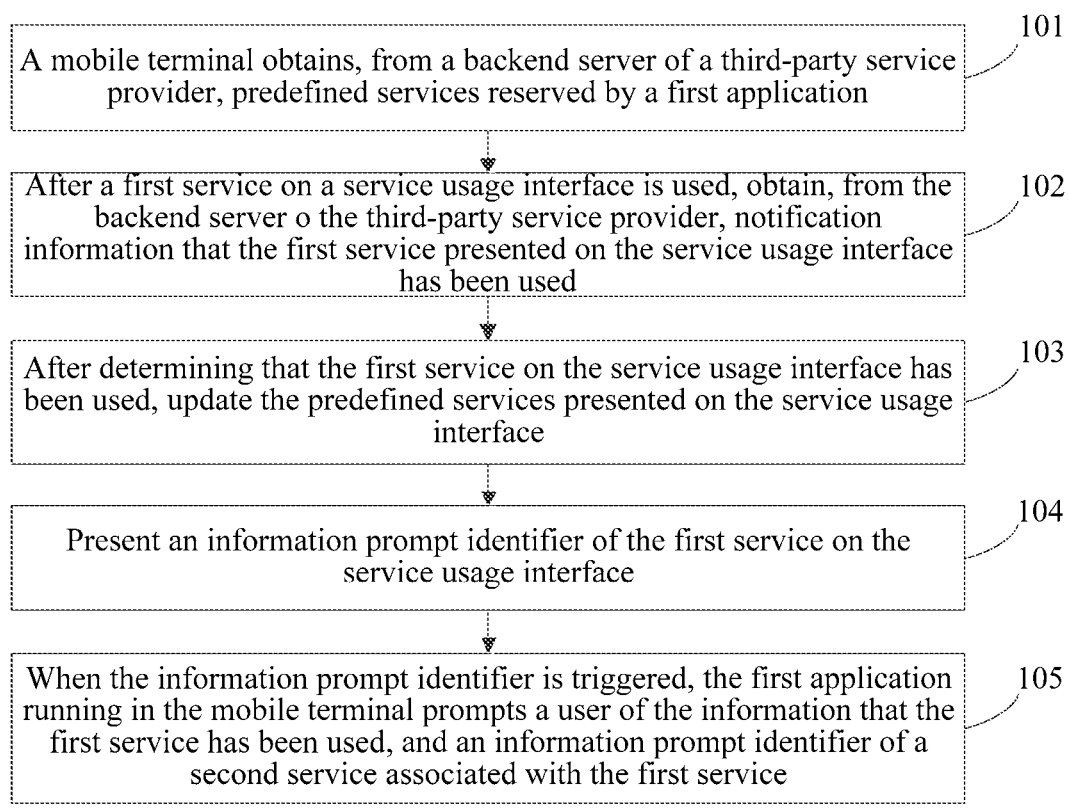
FIG. 1 is a first flowchart of implementation of a service processing method according to an embodiment of the present technology.
Figure 2:
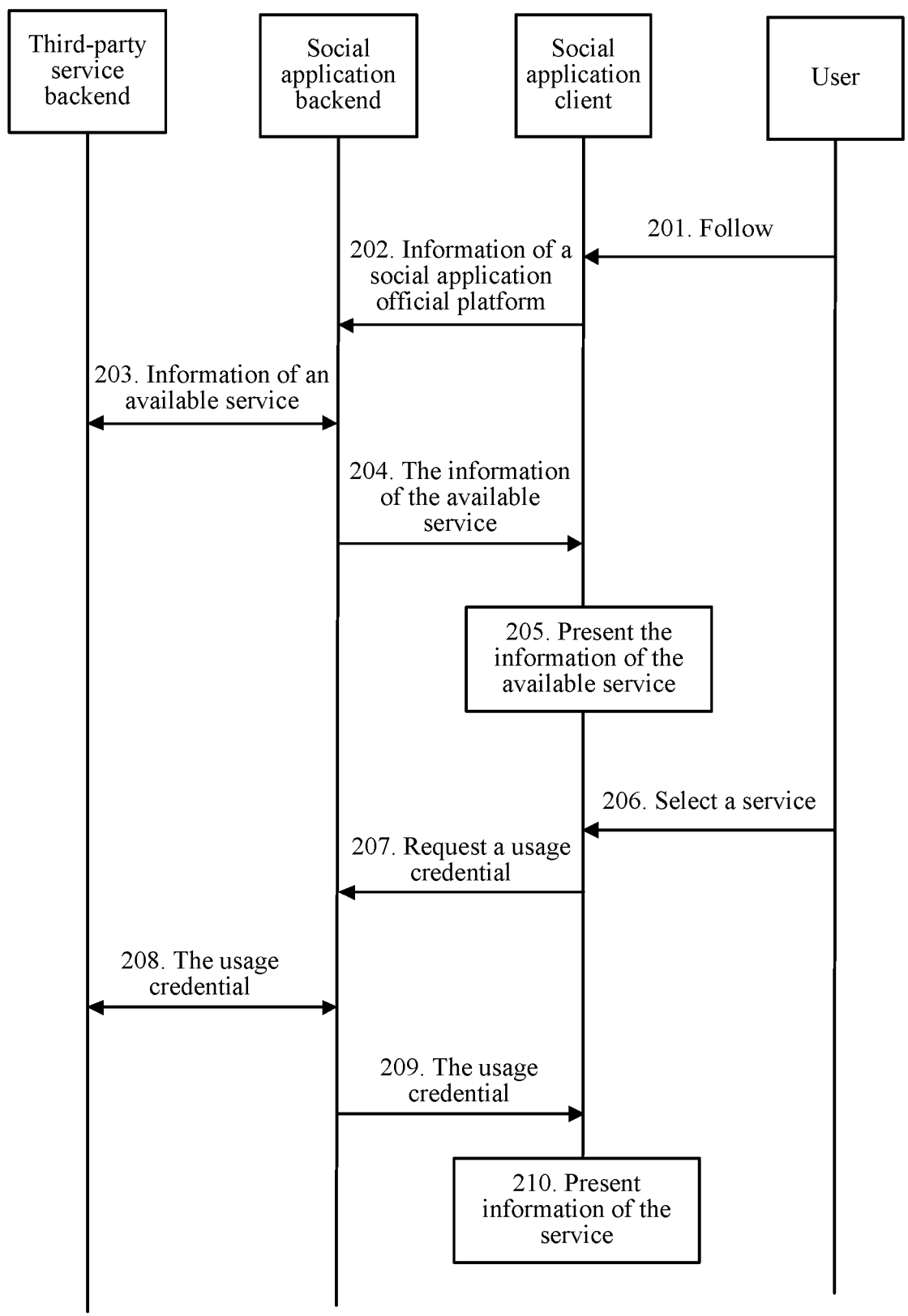
FIG. 2 is a second flowchart of implementation of a service processing method according to an embodiment of the present technology.

Referring to an optional schematic flowchart of a service processing method shown in FIG. 1, when the mobile terminal obtains, from a backend server of third-party service provider, predefined services (e.g., reserved services corresponding to the third party service provider, such as online coupons, and discounts, credits, etc. offered by the third-party service provider to the user of the first application) by the first application (operation 101), using that the first application is a social application as an example, there are the following two typical manners:

Manner 1: Referring to FIG. 2, a user follows, by means of a social application (a social networking application client) in a mobile terminal, a social application platform (e.g., a registered public account of an entity, such as an online retailer, a celebrity, etc.) that provides a third-party service (e.g., retail services of goods, reservation services for restaurants, spas, house cleaning, etc.) (operation 201). The social application platform implements a function based on the social application. Individuals and enterprises may register public accounts of social application platforms. By means of the public accounts registered for the social application platforms, the individuals and enterprises can comprehensively communicate and interact with particular groups by using texts, pictures, and voices. The user may follow, by using a subscription function provided in the social application platform, a public account (such as the foregoing public accounts providing a third-party service) in which the user is interested, and receive related notification information pushed by the public account.

The social application sends, to a social application backend server, information of the followed social application platform (operation 202). The social application backend server obtains information of an available service from a corresponding backend server of the third-party service provider (operation 203), and sends the information of the service to the social application in the mobile terminal (operation 204). The social application presents the information of the service on the display interface (operation 205) to the user for selection. After the user selects a desired service (operation 206), the social application submits a request for obtaining a usage credential (e.g., backend servers of different third-party service providers providing services have different usage credentials that are in a form of a sequence number, or a graphic code such as a bar code and a two-dimensional code) of the service to the social application backend server, where the usage credential uniquely identifies the service (operation 207). The social application backend server obtains the corresponding usage credential from the backend server of third-party service provider (operation 208), and sends the corresponding usage credential to the social application in the mobile terminal (operation 209). The social application may present the obtained information of the service on a service usage interface (operation 210, where the obtained usage credential is a credential that ensures the user to subsequently use the service, and may be displayed on the service usage interface, or may not be displayed).

Figure 3:
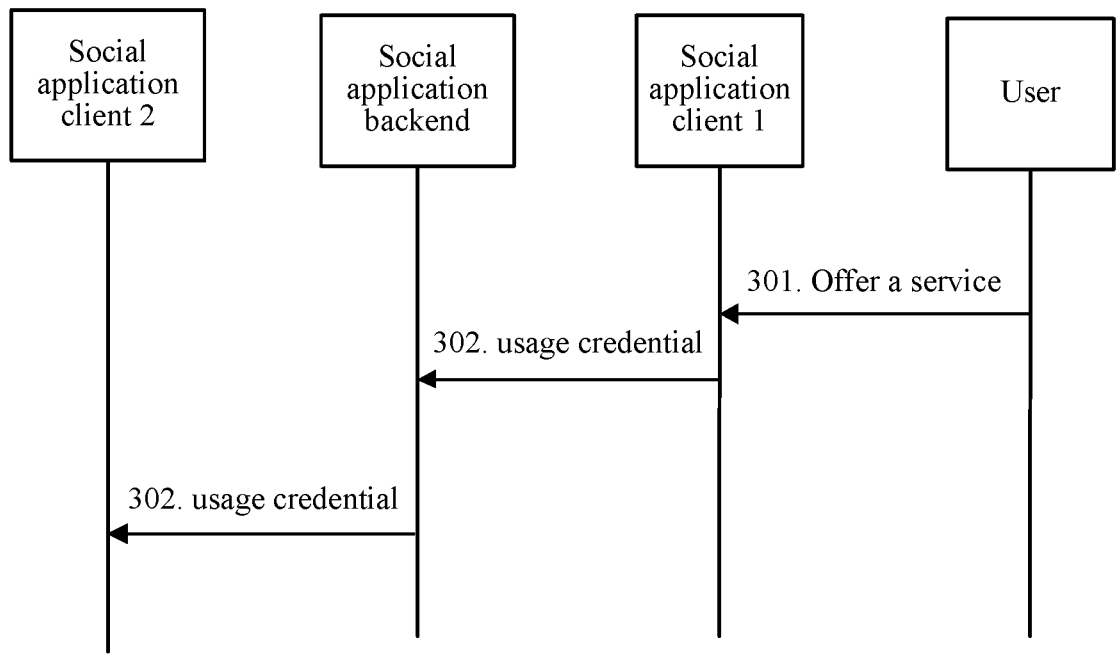
FIG. 3 is a third flowchart of implementation of a service processing method according to an embodiment of the present technology.

Manner 2: Referring to FIG. 3, after obtaining a service by using the social application, the user may select one or more services on the service usage interface and offer the one or more services to another contact in the social application. After the user triggers a social application client 1 to offer the service to the another contact in the social application (operation 301), the social application (the social application client 1) sends, by using the social application backend server, usage credentials of the one or more services to the social application (a social application client 2) of the contact in the social application (operation 302 and operation 303).

In the foregoing manners, the first application may obtain usage credentials of reserved services from backend servers of different third-party service providers, and present the reserved services on the service usage interface of the first application.

Figure 4:
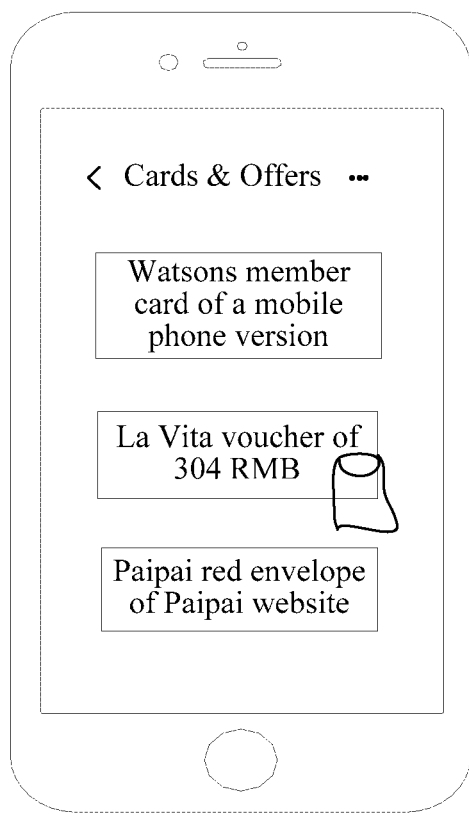
FIG. 4 is a first schematic diagram of a service usage interface according to an embodiment of the present technology.
Figure 5:
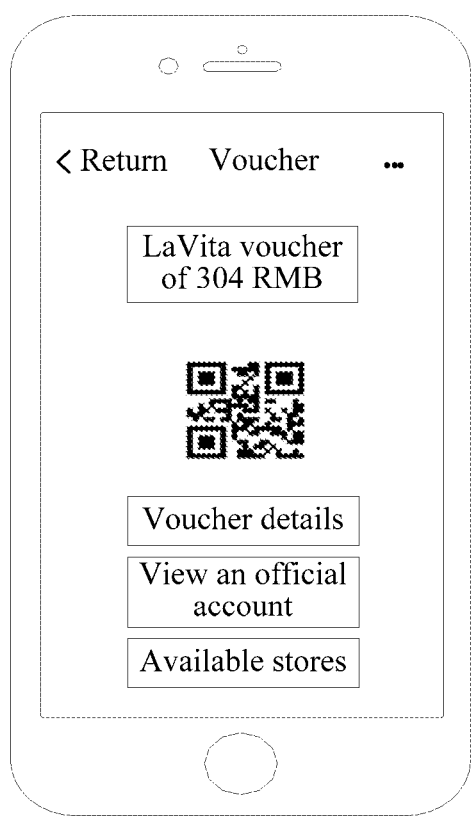
FIG. 5 is a schematic diagram of a usage credential interface according to an embodiment of the present technology.

Referring to FIG. 4, a Cards & Offers user interface (e.g., an electronic coupon organizer or electronic wallet user interface) in the social application (that is, a Cards & Offers function in the social application that supports presentation, on a service usage interface, of electronic credentials of various services obtained by the user) shows multiple services reserved (e.g., saved, retained, clipped, collected, purchased, etc.) by the user by using the social application. The services include a group-buying coupon, a member card, and a red envelope. When the user needs to use a voucher (a first service), the user may select the voucher in a particular operation manner (such as a single-tap or a double-tap). The social application detects, on the Cards & Offers interface, an operation of selecting the voucher for use. When detecting that the voucher is selected for use, the social application switches the Cards & Offers interface (the service usage interface) to a detail interface (a usage credential interface) of the voucher, obtains a two-dimensional code (a usage credential) of the voucher, and presents the two-dimensional code on the detail interface (the usage credential interface) shown in FIG. 5. A service provider may scan the two-dimensional code, to confirm an identity of the user and provide a corresponding service.

After the first service on the service usage interface is used, the mobile terminal obtains, from the backend server of third-party service provider, notification information that the first service presented on the service usage interface has been used (operation 102).

Figure 6:
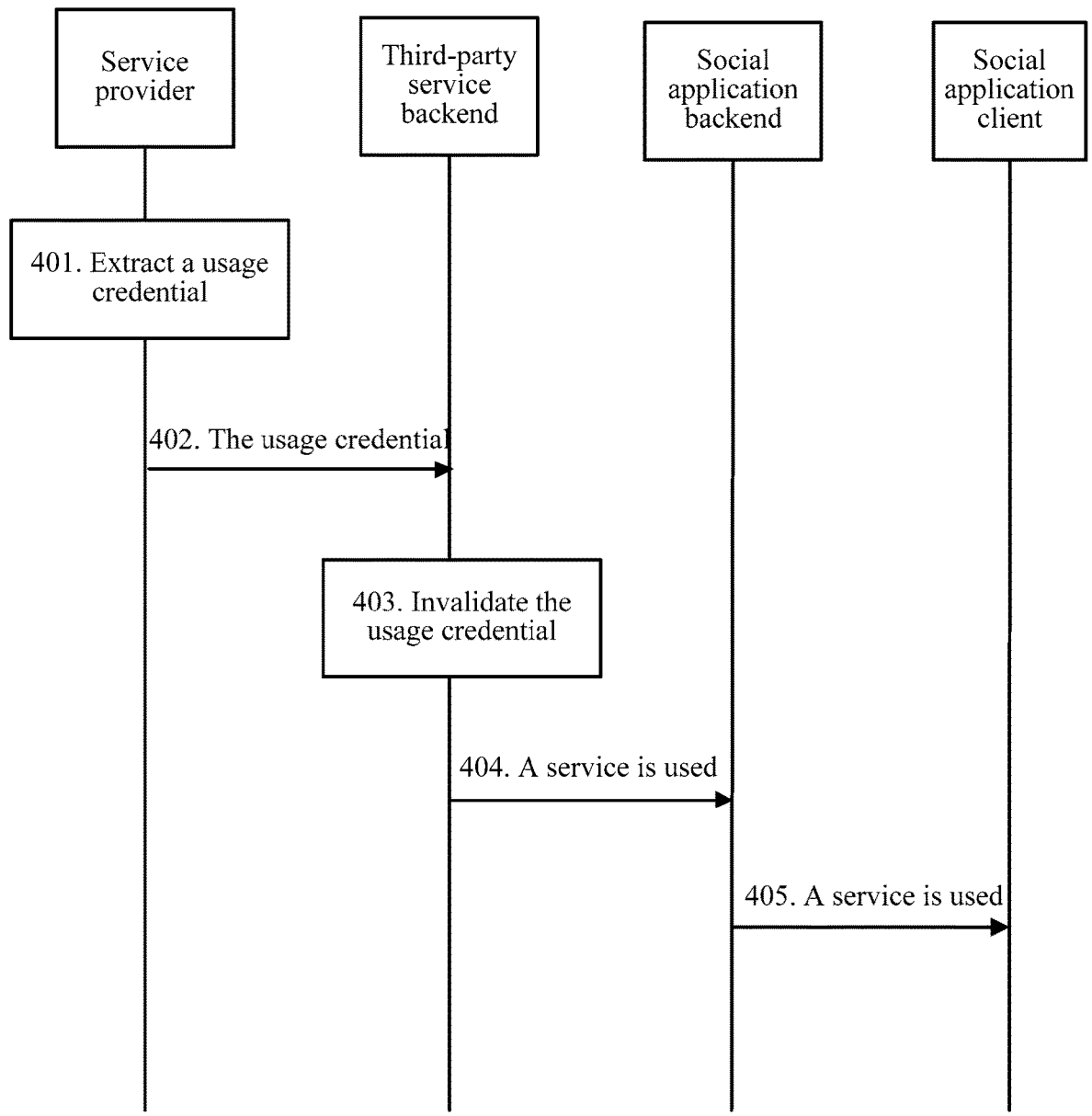
FIG. 6 is a fourth flowchart of implementation of a service processing method according to an embodiment of the present technology.

Specifically, referring to FIG. 6, when the voucher (the first service) on the service usage interface of the first application is used, the service provider extracts the usage credential of the voucher (the first service) (operation 401). After the voucher (the first service) is used, the service provider submits the usage credential of the voucher (the first service) that has been used to the backend server of third-party service provider (operation 402), so that the backend server of third-party service provider invalidates the usage credential of the voucher (the first service) (operation 403). After invalidating the usage credential of the voucher (the first service), the backend server of third-party service provider sends a message indicating that the voucher (the first service) has been used to the social application backend server (operation 404). The social application backend server sends the message indicating that the voucher (the first service) has been used to a corresponding social application (operation 405). Therefore, the mobile terminal obtains, from the backend server of third-party service provider, the notification information that the first service presented on the service usage interface has been used (operation 102, where the message is certainly transmitted to the mobile terminal by the social application platform).

Because the service usage interface of the first application in the mobile terminal is used to present a reserved service to be used, after determining that the voucher (the first service) on the service usage interface is used, the mobile terminal updates the predefined services on the service usage interface (operation 103). The mobile terminal no longer presents at least the first service, and presents an information prompt identifier of the first service on the service usage interface (operation 104).

Figure 7:
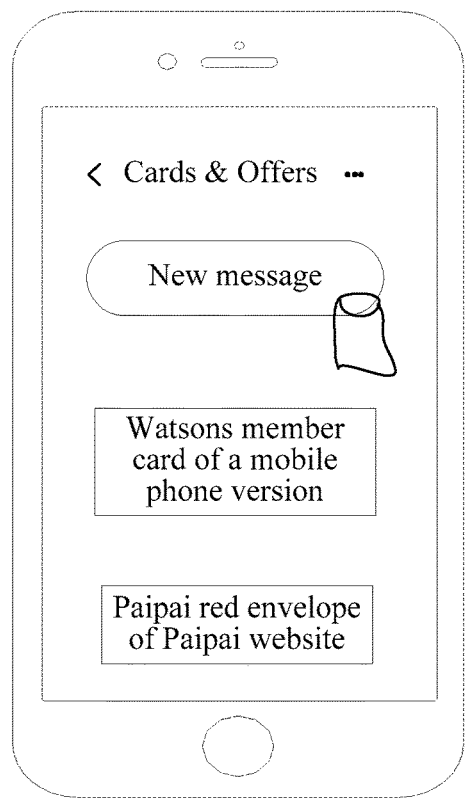
FIG. 7 is a schematic diagram of presenting prompt information on a service usage interface according to an embodiment of the present technology.

In this embodiment of the present technology, an area in which the information prompt identifier is displayed and that is on the service usage interface, and a manner of displaying the information prompt identifier are not limited. The information prompt identifier may be displayed in any unoccupied area on the service usage interface, and may be displayed in a form of an image and a text, or by using a combination thereof. Referring to FIG. 7, after the voucher (the first service) in FIG. 4 is used, the mobile terminal obtains, based on the processing procedure in FIG. 6, notification information that the voucher has been used, stops presenting the voucher (the first service) on the service usage interface, and presents the information prompt identifier in a form of a text.

When the information prompt identifier is triggered, the first application running in the mobile terminal prompts the user the information that the voucher (the first service) has been used, and an information prompt identifier of a second service associated with the first service (operation 105). When the information prompt identifier of the second service is triggered, the second service is added to the service usage interface of the first application. The second service is a service associated with the first service in multiple aspects. After the user uses the first service, it is obviously more probable for the user to choose to use the second service compared with another service. Therefore, the second service having the highest probability of being subsequently used is recommended to the user according to a service using status of the user, and customized service recommendation is implemented. Service recommendation precision is apparently higher than that of uniform service recommendation that does not distinguish users in related technologies. In addition, the second service is recommended to the user when the user triggers the information prompt identifier of the first service to view the notification information that the first service has been used. Therefore, there is no need to deliver the second service by using a particular message, thereby avoiding that normal communication of the user is interfered because information prompts are frequently sent.

As mentioned above, the first service may be associated with the second service in multiple aspects. An example is as follows:

1. The second service and the first service are services of a same type and are provided by a same service provider. Generally, a user may use a reserved service such as a voucher for multiple times. A service which has been used by the user is recommended to the user, so that it is convenient for the user to use the service again. Certainly, when the user uses again a service whose type is the same as that of the first service, requirements of the user may be higher than those of the user that existed when the user used the first service previously. Therefore, although the second service and the first service are services of the same type, a service measurement (such as a value of a voucher and a data volume of a communication traffic coupon) carried by the second service may be greater or less than that carried by the first service.

2. The second service and the first service are services of a same type and are provided by different service providers. During actual application, a service provider of the first service may not provide the first service again temporarily after the first service is used. In this case, the second service that is provided by another service provider and that is of the same type as that of the first service may be recommended to the user, thereby implementing common impression of services. For example, after a voucher (the first service) of KFC is provided, a voucher (the second service) of McDonald's may be recommended to the user.

3. A type of the second service is associated with a type of the first service. For example, cosmetic and health services may be associated. When the first service is a beauty salon experience card, the second service may be a physical examination card.

In an embodiment, in operation 105, when the notification information that the first service has been used and the information prompt identifier of the second service associated with the first service are presented, the service usage interface may be switched to an information prompt interface different from the service usage interface of the first application, and the notification information that the first service has been used and the information prompt identifier of the second service are presented on the information prompt interface. When the information prompt identifier of the first service is triggered on the service usage interface of the first application running in the mobile terminal, the first application running in the mobile terminal switches the service usage interface to the information prompt interface, and presents, on the information prompt interface, the information that the first service has been used and the information prompt identifier of the second service associated with the first service, so as to recommend the second service to the user while prompting that the first service has been used. In an example, the information prompt identifier of the second service may carry description information of the second service. The following provides description respectively.

Figure 8:
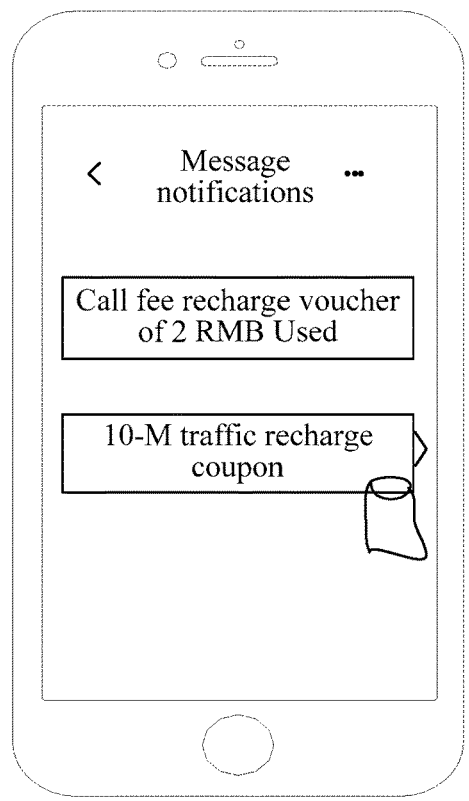
FIG. 8 is a first schematic diagram of an information prompt interface according to an embodiment of the present technology.
Figure 9:
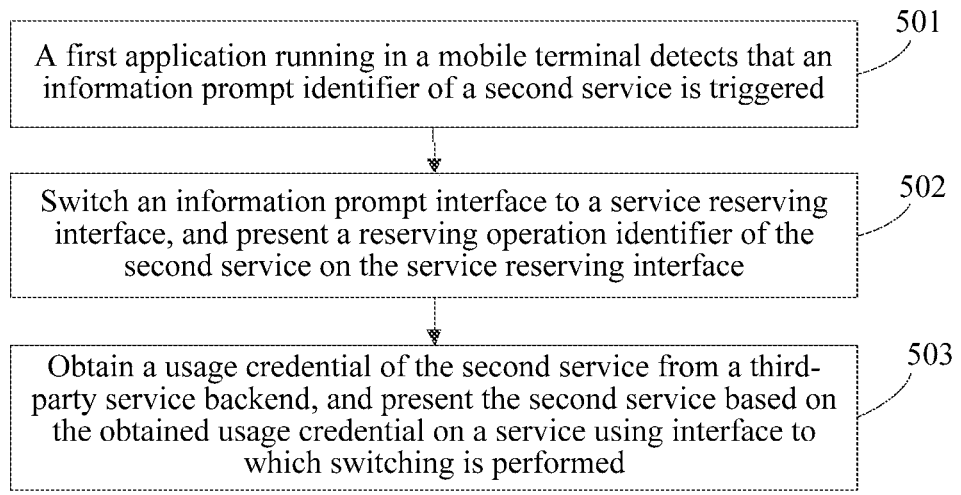
FIG. 9 is a fifth flowchart of implementation of a service processing method according to an embodiment of the present technology.

With reference to the service usage interface shown in FIG. 7, when the information prompt identifier of the first service is triggered, the service usage interface is switched to the information prompt interface shown in FIG. 8. On the information prompt interface, the notification information that the first service has been used (information such as a use time and place may also be included) and the information prompt identifier of the second service are included. The information prompt identifier of the second service carries description information corresponding to the second service. The feature description information is used to represent a feature of association between the second service and the first service. For example, the second service and the first service both belong to a same service provider. When the user needs to use the recommended second service, the user performs a trigger operation (e.g., a tap or other similar activating or selecting operation) on the information prompt identifier of the second service that is shown in FIG. 8. Referring to FIG. 9 and with reference to FIG. 10, when the first application running in the mobile terminal detects that the information prompt identifier of the second service is triggered (operation 501), the information prompt interface shown in FIG. 8 is switched to a service reserving interface shown in FIG. 10, and a reserving operation identifier of the second service is presented on the service reserving interface (operation 502).

Figure 11:
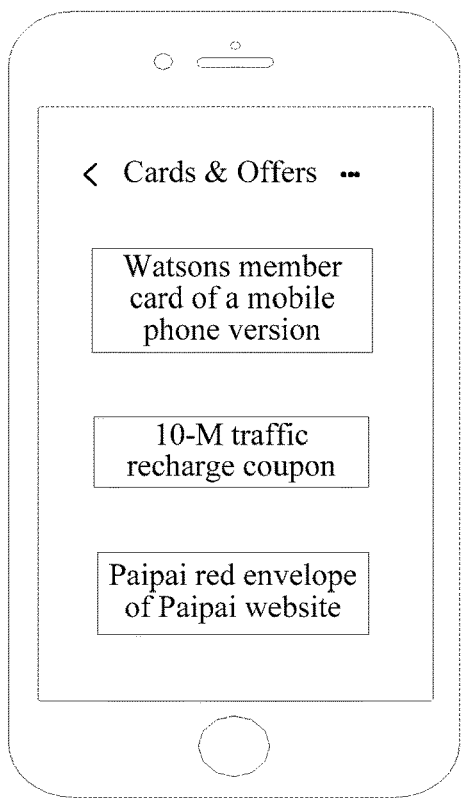
FIG. 11 is a second schematic diagram of a service usage interface according to an embodiment of the present technology.

When it is detected that the reserving operation identifier of the second service is triggered, a usage credential of the second service is obtained from the backend server of third-party service provider. As shown in FIG. 11, the second service is presented based on the obtained usage credential on the service usage interface to which switching is performed (operation 503). The user may use the second service presented on the service usage interface. A specific using method is the same as the method for using the first service, and details are not described herein again. Therefore, the information that the first service has been used is prompted to the user, and the second service that may be used by the user is recommended to the user at the same time according to a service using status of the user.

Figure 10:
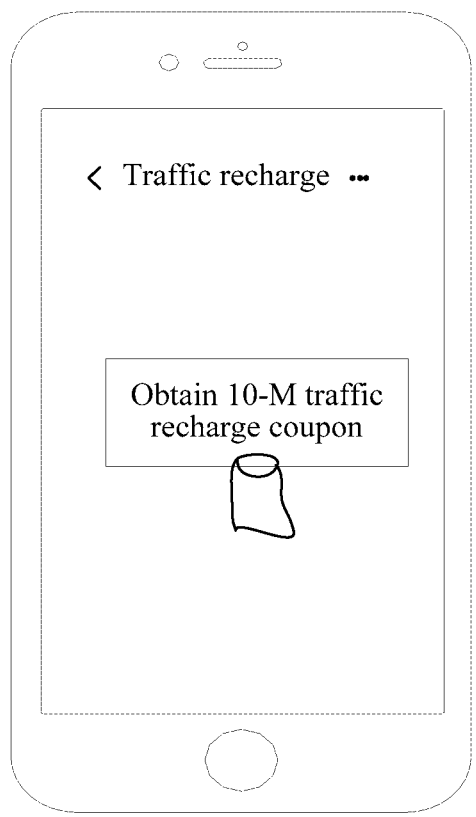
FIG. 10 is a schematic diagram of a service reserving interface according to an embodiment of the present technology.

FIG. 10 is the reserving operation interface of the second service. The reserving operation interface is presented when the first application running in the mobile terminal switches to an interface of the service provider. The information prompt identifier (linked to a service reserving interface of the service provider) of the second service shown in FIG. 8 may be implemented by using a text link. Therefore, tracking and recommendation in a form of a text link is implemented. That is, the second service is recommended in the form of the text link while it is prompted that the first service has been used.

In an embodiment, in operation 105, when the notification information that the first service has been used and the information prompt identifier of the second service associated with the first service are presented, the service usage interface may be switched to an information prompt interface different from the service usage interface of the first application, and the notification information that the first service has been used and the information prompt identifier of the second service are presented on the information prompt interface. When the information prompt identifier of the first service is triggered on the service usage interface of the first application running in the mobile terminal, the first application running in the mobile terminal switches the service usage interface to the information prompt interface, and presents, on the information prompt interface, the notification information that the first service has been used and the information prompt identifier of the second service associated with the first service, so as to recommend the second service to the user while prompting that the first service has been used. The information prompt identifier of the second service carries the reserving operation identifier corresponding to the second service.

Figure 12:
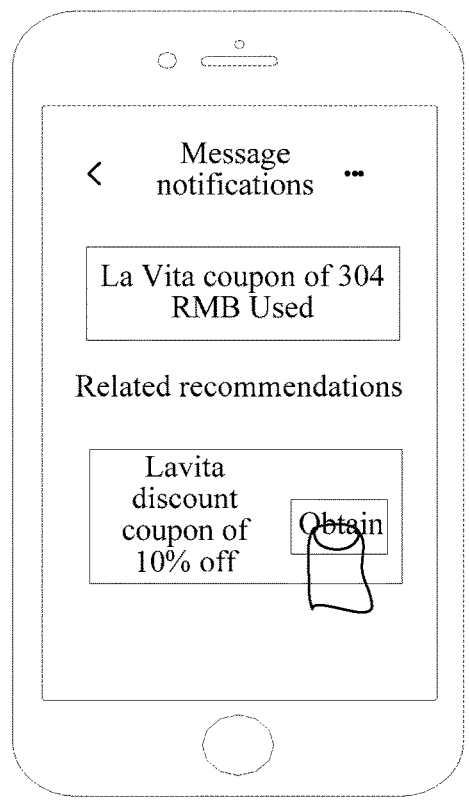
FIG. 12 is a second schematic diagram of an information prompt interface according to an embodiment of the present technology.
Figure 13:
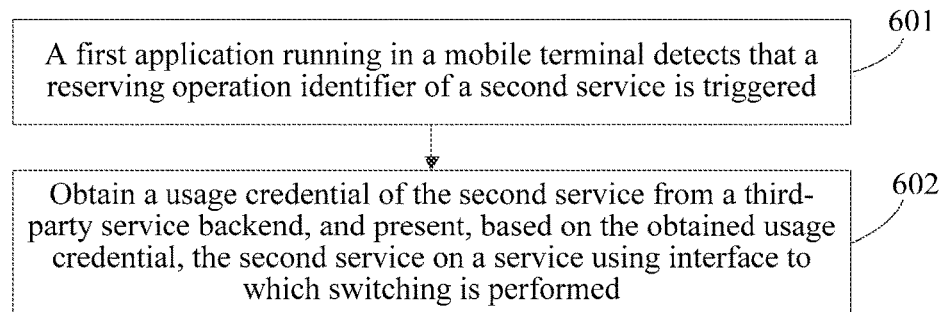
FIG. 13 is a sixth flowchart of implementation of a service processing method according to an embodiment of the present technology.
Figure 14:
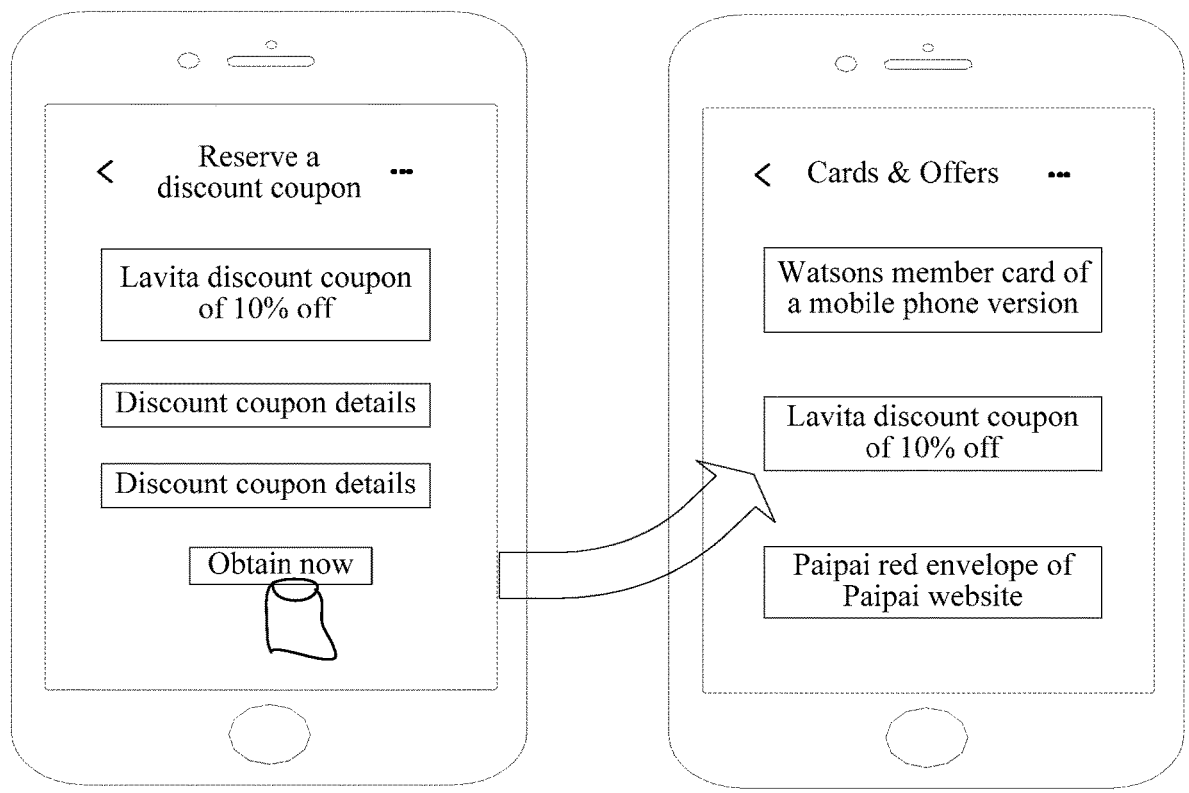
FIG. 14 is a schematic diagram of switching a service reserving interface to a service usage interface according to an embodiment of the present technology.

With reference to the service usage interface shown in FIG. 7, when the information prompt identifier of the first service is triggered, the service usage interface is switched to the information prompt interface in FIG. 12. On the information prompt interface, the information that the first service has been used (information such as a use time and place may also be included) and the reserving operation identifier of the second service are included. When the user needs to reserve a second service, the user performs a trigger operation on the reserving operation identifier of the second service that is shown in FIG. 12. Referring to FIG. 13 and FIG. 14, the first application running in the mobile terminal detects that the reserving operation identifier of the second service is triggered (operation 601), obtains the usage credential of the second service from the backend server of third-party service provider, and presents, based on the obtained usage credential, the second service on the service usage interface to which switching is performed (operation 602). The user may use the second service presented on the service usage interface. A specific using method is the same as the method for using the first service, and details are not described herein again. The notification information that the first service has been used is prompted to the user, and the second service (A service provider of the second service may be different from that of the first service. For example, in FIG. 8, the service provider of the first service, that is, a social application recharge service, is a social application recharge platform, but in FIG. 10, a service provider of the second service, that is, a 10-M traffic recharge coupon, is an operator) that may be used by the user is recommended to the user at the same time according to a service using status of the user.

In the foregoing example, the reserving operation identifier of the second service is directly presented on the information prompt interface, so that it is convenient for the user to rapidly reserve the second service. The reserving operation identifier of the second service on the information prompt interface implements recommendation of a service that is from a same source (from a same service provider) as that of the first service, and implements trace and recommendation of a native service. That is, a service from the same service provider as that of the first service (For example, the first service shown in FIG. 12, that is, a voucher, and the second service shown in FIG. 14, that is, a discount coupon, are both from a LaVita merchant) is recommended to the user.

Figure 15:
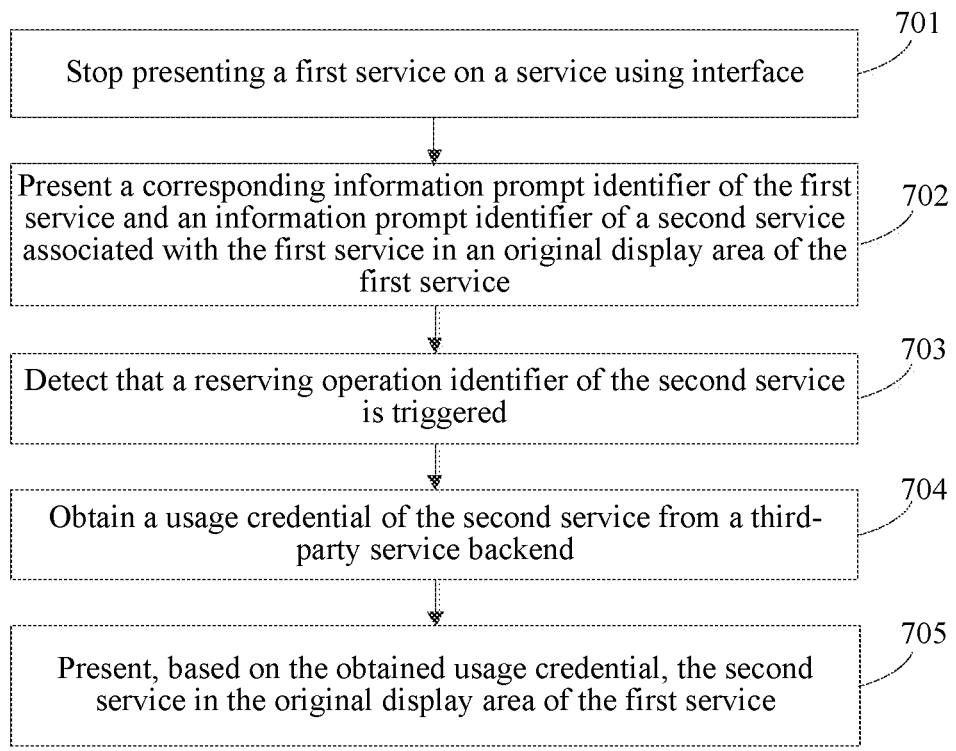
FIG. 15 is a seventh flowchart of implementation of a service processing method according to an embodiment of the present technology.
Figure 16:
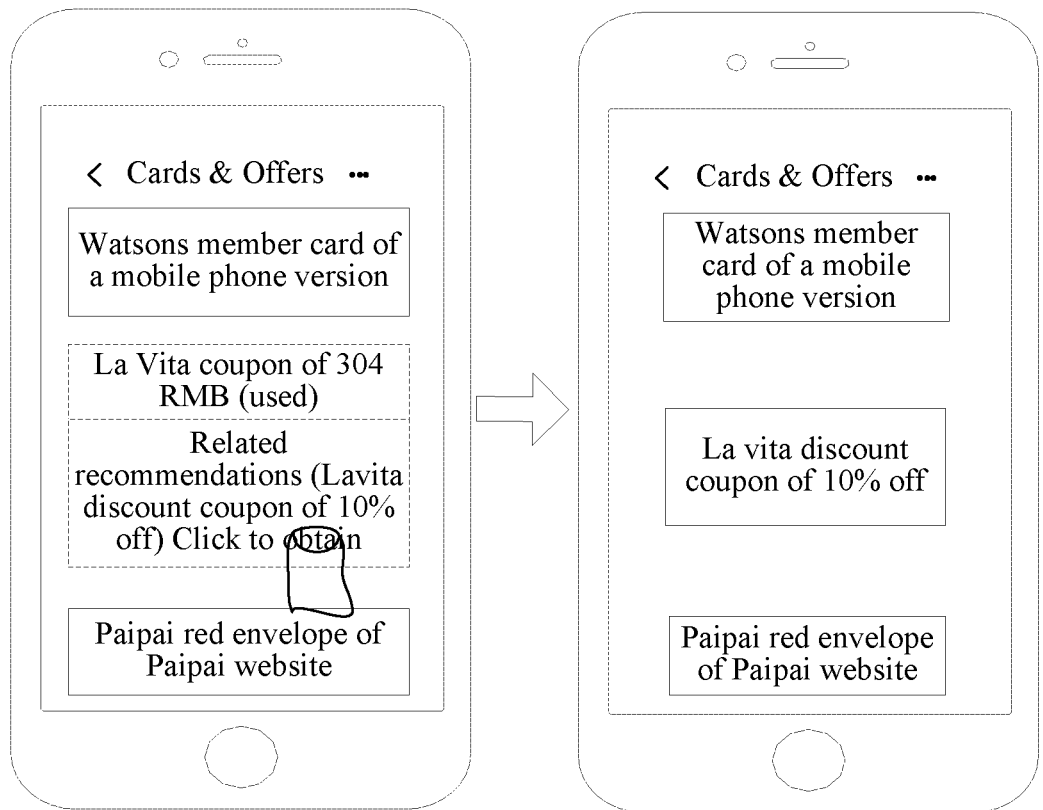
FIG. 16 is a third schematic diagram of a service usage interface according to an embodiment of the present technology.

In an embodiment, in operation 105, the notification information that the first service has been used and the information prompt identifier of the second service associated with the first service may be presented on the service usage interface of the first application (that is, interface switching is not performed). With reference to FIG. 15 and referring to FIG. 16, presentation of the first service on the service usage interface is stopped (operation 701); the corresponding information prompt identifier of the first service and the information prompt identifier of the second service associated with the first service are presented in an original display area of the first service (operation 702); it is detected that the reserving operation identifier of the second service is triggered (operation 703); the usage credential of the second service is obtained from the backend server of third-party service provider (operation 704); and the second service is presented in the original display area of the first service based on the obtained usage credential (operation 705). There is no need to switch display interfaces, so that the user can reserve a required service without leaving a current operation interface, and the user can experience a continuous operation. As mentioned above, the information prompt identifier of the second service may be presented in at least two manners. In an example 1, the information prompt identifier of the second service may carry description information of the second service; or in an example 2, the information prompt identifier of the second service may carry the reserving operation identifier corresponding to the second service.

Figure 17:
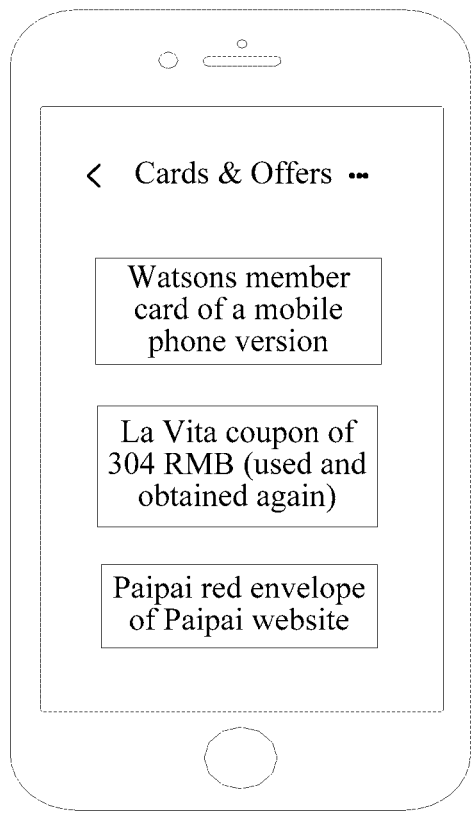
FIG. 17 is a fourth schematic diagram of a service usage interface according to an embodiment of the present technology.
Figure 18:
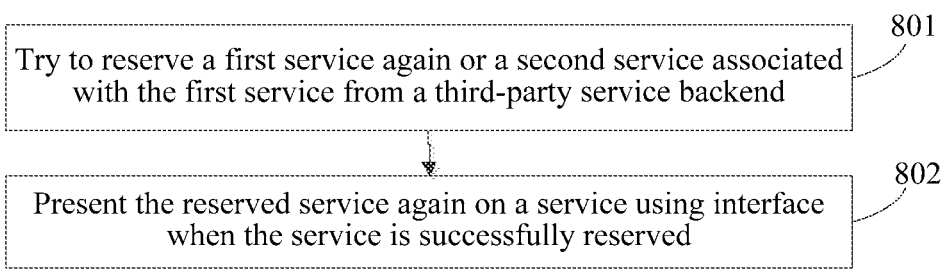
FIG. 18 is an eighth flowchart of implementation of a service processing method according to an embodiment of the present technology.

As mentioned above, after the first service on the service usage interface of the first application running in the mobile terminal has been used, the first application running in the mobile terminal updates the predefined services on the service usage interface. In an embodiment, referring to FIG. 17 and with reference to FIG. 18, based on that presentation of the first service on the service usage interface is stopped, the first service is reserved again or the second service associated with the first service may be reserved from the backend server of third-party service provider (operation 801); and when being successfully reserved, the reserve service is presented again on the service usage interface (operation 802). Because the first service is a service that has been used by the user, it is more probable for the user to subsequently use the first service again or the second service associated with the first service compared with a service that has never been used by the user, thereby improving precision of service recommendation to the user.

Based on the above, in some embodiments, a service processing method includes: A service processing method, the method comprising: at a device having one or more processors and memory: presenting predefined services (e.g., coupons and/or membership cards associated with various services, including services provided by a third party service provider) by means of a service usage interface (e.g., a listing user interface of a coupon and card organizer interface) of the first application (e.g., a social networking client application); obtaining, from a backend server of a third-party service provider (e.g., service provider of the first service), notification information (e.g., a confirmation notification for a transaction to which a first service coupon for a first service has been applied) that a first service presented on the service usage interface has been used; in response to obtaining the notification information (e.g., confirmation in a pushed notification to the social networking client application), updating the predefined services on the service usage interface (e.g., revising or updating the listing of coupons and cards), and presenting an information prompt identifier corresponding to the first service (e.g., the information prompt identifier is a banner or card or window that identifies the first service); detecting that the information prompt identifier corresponding to the first service is triggered (e.g., selected by the user by a tap gesture), and in response to detecting that the information prompt identifier corresponding to the first service is triggered, presenting the notification information that the first service has been used and an information prompt identifier (e.g., a banner or image of a coupon or card) of a second service associated with the first service, the information prompt identifier of the second service being capable of prompting a user to add the second service to the service usage interface of the first application (e.g., save the second coupon for the second service in the coupon and card organizer listing).

In some embodiments, the presenting the notification information that the first service has been used and the information prompt identifier of the second service associated with the first service comprises: switching the service usage interface to an information prompt interface (e.g., a notification listing interface that includes a plurality of notifications received in the first application); and presenting, on the information prompt interface, the notification information that the first service has been used and the information prompt identifier of the second service associated with the first service.

In some embodiments, the method includes: carrying, by the information prompt identifier of the second service, feature description information corresponding to the second service, the feature description information being used to represent a feature of association between the second service and the first service. For example, the description information indicates that the second coupon is the same as the first coupon or that the second coupon relates to the same goods or services as the first service but a different value amount, etc. The method further includes: detecting that the information prompt identifier of the second service is triggered (e.g., by a tap input); in response to detecting that the information prompt identifier of the second service is triggered, switching the information prompt interface (e.g., a notification listing user interface) to a service reserving interface (e.g., a coupon selection/claiming or saving interface), and presenting a reserving operation identifier of the second service on the service reserving interface. The method further includes: detecting that the reserving operation identifier of the second service is triggered, obtaining a usage credential of the second service from the backend server of the third-party service provider (e.g., a serial number, a barcode, etc.); and presenting, based on the obtained usage credential, the second service on the service usage interface after having switched from the service reserving interface back to the service usage interface.

In some embodiments, the method includes: carrying, by the information prompt identifier of the second service, a reserving operation identifier corresponding to the second service; detecting that the reserving operation identifier of the second service is triggered; and in response to detecting that the reserving operation identifier of the second service is triggered, obtaining a usage credential of the second service from the backend server of third-party service provider; and presenting, based on the obtained usage credential, the second service on the service usage interface after having switched from a service reserving interface back to the service usage interface.

In some embodiments, the updating the predefined services on the service usage interface, and presenting the information prompt identifier corresponding to the first service includes: stopping presenting the first service on the service usage interface, and presenting, in an original display area of the first service, the information prompt identifier corresponding to the first service. The method further includes: presenting the information prompt identifier of the second service in the original display area of the first service, wherein the information prompt identifier of the second service carries a reserving operation identifier corresponding to the second service; and detecting that the reserving operation identifier of the second service is triggered; in response to detecting that the reserving operation identifier of the second service is triggered: obtaining a usage credential of the second service from the backend server of the third-party service provider; and presenting, based on the obtained usage credential, the second service in the original display area of the first service.

In some embodiments, the updating the predefined services on the service usage interface includes: stopping presenting the first service on the service usage interface; trying to reserve the first service again from the backend server of the third-party service provider; and presenting the first service again on the service usage interface when the first service is successfully reserved.

In some embodiments, the method includes: detecting, on the service usage interface, an operation of selecting a service for use; and when it is detected that the first service is selected for use, switching the service usage interface to a usage credential interface, obtaining the usage credential of the first service, and presenting the user credential of the first service on the usage credential interface.

In some embodiments, the social networking application includes a card and coupons interface and during online transaction, the user can select the affordance for the cards and coupons interface and causes the cards and coupons interface to be displayed. After selecting a coupon and apply the coupon for the online transaction, the sever of the online transaction pushes a notification to the client terminal, where the pushed notification includes both a confirmation of the transaction and summary of the transaction, but also information for recommending a second coupon for the same or a related service or goods. The pushed notification is parsed by the client terminal and the information regarding the transaction is displayed in a listing of notifications in the social network application notification interface, and the information regarding the second coupon is presented in a coupon listing interface, e.g., together with other coupons that are already saved by the user, and optionally with other coupons that are recommended as a result of other transactions that occurred on the user device. In some embodiments, the user when looking at the listing of coupons and cards in the coupons and cards interface, can click on one of the recommended coupons to view details of the coupon or claim and save the coupon to the listing of coupons that can be directly applied in transactions. The notification information conventionally only includes transaction confirmation and summary information, and the whole notification content is displayed to the user as a notification (e.g. in a notification banner). As disclosed herein, the notification information received from the third-party server is parsed by the client terminal, and some of the information is displayed in a first notification banner in a notification listing, and some of the information is displayed in a second banner in a coupon listing user interface. In some embodiments, the parsing is performed by the social network server, and the single notification information is pushed to the client terminal as two separate notifications which are displayed by the client terminal in two different listings (e.g., notification listing, and coupon and cards listing).

In some embodiments, the client terminal allows the user to select and forward/share the coupon or card (or other usage credentials) via an instant message to a social network contact. In some embodiments, in response to receiving a user's input to select and forward a coupon or other usage credential, the client terminal duplicates the usage credential and sends it to the social network contact via a messaging channel of the social network platform. In some embodiments, the coupon or usage credential is transferred to the social network contact and the coupon or usage credential is deleted from the user's device. In some embodiments, when the social network contact applies the coupon or usage credential in an online transaction later, a reward coupon is sent by the third party backend server of the service to the user as a reward. In some embodiments, the unclaimed coupons and cards a listed before the claimed coupons and cards in the coupon and cards listing user interface to indicate that attention is still required from the user; in other words, the unclaimed coupon still carries the notification property of the original notification information and requires a user input to be cleared from the device. In some embodiments, the notification for the transaction is cleared from the notification listing in response to user viewing or automatic clearing, while the coupon carried in the notification information still remains in the coupon and cards listing user interface. In some embodiments, the coupon portion and the transaction conformation portions of the notification information are cleared independently of each other by system rules and user inputs.

Other details of the method are provided with respect to other parts of the present disclosure, and can be combined with the above method without limitation except where explicitly stated.

In an embodiment, a service processing apparatus is further provided. The service processing apparatus may be disposed in the mobile terminal, and a processor in the mobile terminal reads executable instructions in a readable medium (such as a flash memory or a hard disk), so as to implement functions of the service processing apparatus.

Figure 19:
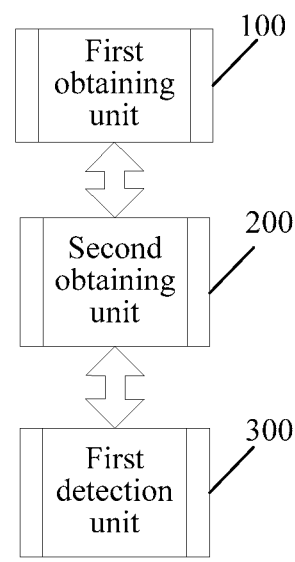
FIG. 19 is a schematic diagram of a functional structure of a service processing apparatus according to an embodiment of the present technology.

Referring to a schematic diagram of a functional structure of the service processing apparatus shown in FIG. 19, the service processing apparatus includes:

a first obtaining unit 100, configured to: obtain, from a backend server of third-party service provider, predefined services of a first application, and present the predefined services by means of a service usage interface of the first application;

a second obtaining unit 200, configured to: obtain, from the backend server of third-party service provider, notification information that a first service presented on the service usage interface has been used, update the predefined services on the service usage interface, and present an information prompt identifier corresponding to the first service; and a first detection unit 300, configured to: detect that the information prompt identifier corresponding to the first service is triggered, and present the notification information that the first service has been used and an information prompt identifier of a second service associated with the first service, the information prompt identifier of the second service being capable of prompting a user to add the second service to the service usage interface of the first application.

Exemplarily, the first detection unit 300 is further configured to: switch the service usage interface to an information prompt interface, and present, on the information prompt interface, the notification information that the first service has been used and the information prompt identifier of the second service associated with the first service.

Exemplarily, the information prompt identifier of the second service carries description information corresponding to the second service. The feature description information is used to represent a feature of association between the second service and the first service. The service processing apparatus further includes:

a second detection unit 400 (connected to the first detection unit 300), configured to: detect that the information prompt identifier of the second service is triggered, switch the information prompt interface to a service reserving interface, and present a reserving operation identifier of the second service on the service reserving interface; and a third detection unit 500 (connected to the second detection unit 400), configured to: detect that the reserving operation identifier of the second service is triggered, obtain a usage credential of the second service from the backend server of third-party service provider, and present, based on the obtained usage credential, the second service on the service usage interface to which switching is performed.

Exemplarily, the information prompt identifier of the second service carries the reserving operation identifier corresponding to the second service.

The service processing apparatus further includes:

a fourth detection unit 600 (not shown in FIG. 19 and connected to the third detection unit 500), configured to: detect that the reserving operation identifier of the second service is triggered, obtain a usage credential of the second service from the backend server of third-party service provider, and present, based on the obtained usage credential, the second service on the service usage interface to which switching is performed.

Exemplarily, the second obtaining unit 200 includes:

a first presentation module, configured to: stop presenting the first service on the service usage interface, and present, in an original display area of the first service, the information prompt identifier corresponding to the first service;

a second presentation module (connected to the first presentation module), configured to: present the information prompt identifier of the second service in the original display area of the first service, the information prompt identifier of the second service carrying the reserving operation identifier corresponding to the second service; and a detection module (connected to the second presentation module), configured to: detect that the reserving operation identifier of the second service is triggered, obtain a usage credential of the second service from the backend server of third-party service provider, and present, based on the obtained usage credential, the second service in the original display area of the first service.

Exemplarily, the second obtaining unit 200 is further configured to: stop presenting the first service on the service usage interface; or stop presenting the first service on the service usage interface, try to reserve the first service again from the backend server of third-party service provider, and present the first service again on the service usage interface when the first service is successfully reserved.

Exemplarily, the service processing apparatus further includes:

a fifth detection unit 700 (connected to the fourth detection unit 600), configured to: detect, on the service usage interface, an operation of selecting a service for use; and when it is detected that the first service is selected for use, switch the service usage interface to a usage credential interface, obtain the usage credential of the first service, and present the user credential on the usage credential interface.

Figure 20:
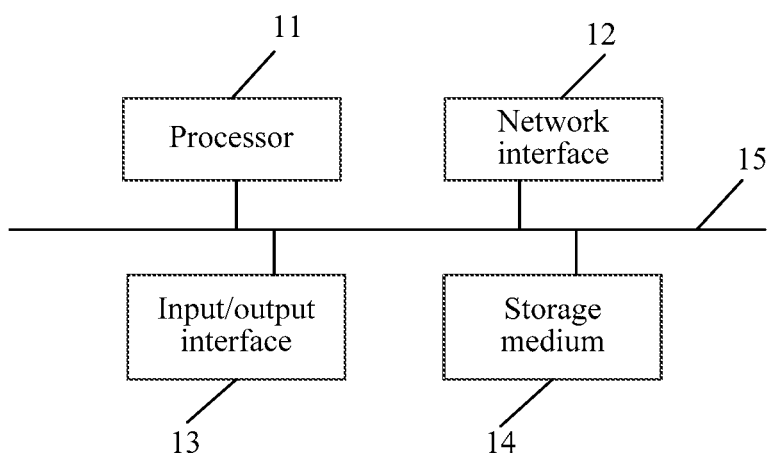
FIG. 20 is a schematic diagram of a hardware structure of a service processing apparatus according to an embodiment of the present technology.

Referring to FIG. 20, FIG. 20 is a schematic diagram of an optional hardware structure of the service processing apparatus. The hardware structure includes a processor 11, an input/output 13 (such as a display screen, a touchscreen, or a speaker), a storage medium 14, and a network interface 12. The components may be connected by using a system bus 15 for communication. Correspondingly, the storage medium 14 stores all executable instructions used for performing the service processing method provided in the embodiments of the present technology. Some or all of the hardware modules shown in FIG. 20 may be implemented, or another hardware module is implemented according to needs. There may be one or more hardware modules for each type. The hardware modules may be implemented in a same geographical location, or may be implemented in different geographical locations.

In an embodiment, a computer readable medium is further provided, and may be a ROM (such as a ROM, a flash memory, or a transfer apparatus), a magnetic storage medium (such as a magnetic tape or a disk drive), an optical storage medium (such as a CD-ROM, a DVD-ROM, a paper card, or a paper tape), and other well-known program memories. The computer readable medium stores computer executable instructions (for example, binary executable instructions of projection applications such as Tencent Video). When the instructions are executed, at least one processor is caused to perform operations that include the following operations:

obtaining, from a backend server of third-party service provider, predefined services of a first application, and presenting the predefined services by means of a service usage interface of the first application;

obtaining, from the backend server of third-party service provider, notification information that a first service presented on the service usage interface has been used, updating the predefined services on the service usage interface, and presenting an information prompt identifier corresponding to the first service; and detecting that the information prompt identifier corresponding to the first service is triggered, and presenting the notification information that the first service has been used and an information prompt identifier of a second service associated with the first service, the information prompt identifier of the second service being capable of prompting a user to add the second service to the service usage interface of the first application.

Exemplarily, when the instructions are executed, the at least one processor is further caused to perform operations that include the following operations:

switching the service usage interface to an information prompt interface, and present, on the information prompt interface, the notification information that the first service has been used and the information prompt identifier of the second service associated with the first service.

Exemplarily, when the instructions are executed, the at least one processor is further caused to perform operations that include the following operations:

carrying, by the information prompt identifier of the second service, description information corresponding to the second service, the feature description information being used to represent a feature of association between the second service and the first service;

detecting that the information prompt identifier of the second service is triggered, switching the information prompt interface to a service reserving interface, and presenting a reserving operation identifier of the second service on the service reserving interface; and detecting that the reserving operation identifier of the second service is triggered, obtaining a usage credential of the second service from the backend server of third-party service provider, and presenting, based on the obtained usage credential, the second service on the service usage interface after having switched from a service reserving interface back to the service usage interface.

Exemplarily, when the instructions are executed, the at least one processor is further caused to perform operations that include the following operations:

carrying, by the information prompt identifier of the second service, the reserving operation identifier corresponding to the second service; and detecting that the reserving operation identifier of the second service is triggered, obtaining a usage credential of the second service from the backend server of third-party service provider, and presenting, based on the obtained usage credential, the second service on the service usage interface after having switched from a service reserving interface back to the service usage interface.

Exemplarily, when the instructions are executed, the at least one processor is further caused to perform operations that include the following operations:

stopping presenting the first service on the service usage interface, and presenting, in an original display area of the first service, the information prompt identifier corresponding to the first service; and presenting the information prompt identifier of the second service in the original display area of the first service, where the information prompt identifier of the second service carries a reserving operation identifier corresponding to the second service; and detecting that the reserving operation identifier of the second service is triggered, obtaining a usage credential of the second service from the backend server of third-party service provider, and presenting, based on the obtained usage credential, the second service in the original display area of the first service.

Exemplarily, when the instructions are executed, the at least one processor is further caused to perform operations that include the following operations:

stopping presenting the first service on the service usage interface; or stopping presenting the first service on the service usage interface, trying to reserve the first service again from the backend server of third-party service provider, and presenting the first service again on the service usage interface when the first service is successfully reserved.

Exemplarily, when the instructions are executed, the at least one processor is further caused to perform operations that include the following operations:

detecting, on the service usage interface, an operation of selecting a service for use; and when it is detected that the first service is selected for use, switching the service usage interface to a usage credential interface, obtaining the usage credential of the first service, and presenting the user credential of the first service on the usage credential interface.

Beneficial effects of the embodiments of the present technology are as follows:

A coupon or an activity (a first service) that has been used by a user, or a related coupon or a related activity (that is, a second service) is recommended to a user by using a message notification based on a consuming behavior of the user. Therefore, recommendation precision is high, and communication of the user is not interfered. A conventional message notification feeds only an offline behavior of the user back to the user, and cannot provide service recommendation information related to a current consuming behavior to the user. Consequently, the message notifying capability bears no value. By means of the embodiments of the present technology, the limitation that a service provider cannot perform a precise operation based on a consuming behavior of a user is removed, so as to perform extension recommendation and cross operating on a service in a message notification of a first application, and meet a requirement of the user for a precise recommendation service.

A person of ordinary skill in the art may understand that all or a part of the operations of the method embodiments may be implemented by a program instructing relevant hardware. The program may be stored in a computer readable storage medium. When the program runs, the operations of the method embodiments are performed. The foregoing storage medium includes any medium that can store program code, such as a mobile storage device, a random access memory (RAM), a read-only memory (ROM), a magnetic disk, or an optical disc.

Alternatively, when the integrated unit in the present disclosure is implemented in a form of a software functional module and sold or used as an independent product, the integrated unit may be stored in a computer readable storage medium. Based on such an understanding, the technical solutions of the embodiments of the present technology essentially, or the part contributing to related technologies may be implemented in a form of a software product. The software product is stored in a storage medium, and includes several instructions for instructing a computer device (which may be a personal computer, a server, or a network device) to perform all or some of the methods described in the embodiments of the present technology. The storage medium includes any medium that can store program code, such as a mobile storage device, a RAM, a ROM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A service processing method, the method comprising:

presenting, at a computing device having one or more processors and memory, predefined services using a service usage interface of a social networking application, wherein the computing device is associated with a user account of the social networking application and each of the predefined services is published by a respective public account of the social networking application subscribed by the user account;

obtaining, from a backend server of a third-party service provider that has a public account at the social networking application, notification information that a first service presented on the service usage interface has been used and a corresponding time and place of such usage;

in response to obtaining the notification information, updating the predefined services on the service usage interface, and presenting an information prompt identifier corresponding to the first service;

detecting that the information prompt identifier corresponding to the first service is triggered by a user of the computing device, and in response to detecting that the information prompt identifier corresponding to the first service is triggered, generating, at the computing device, a recommendation for a second service, the recommendation of the second service is based on the first service that has been used, wherein the second service and the first service are services of a same type and the second service is provided by a different service provider associated with another public account of the social networking application; and presenting the notification information that the first service has been used and an information prompt identifier of the second service, wherein the information prompt identifier of the second service is capable of prompting a user to add the second service to the service usage interface of the social networking application, wherein:

the presenting the notification information that the first service has been used and the information prompt identifier of the second service comprises:

switching the service usage interface to an information prompt interface; and presenting, on the information prompt interface, the notification information that the first service has been used and the information prompt identifier of the second service.

2. The method according to claim 1, wherein the method further includes:

carrying, by the information prompt identifier of the second service, description information corresponding to the second service, the feature description information being used to represent a feature of association between the second service and the first service;

detecting that the information prompt identifier of the second service is triggered by the user of the computing device;

in response to detecting that the information prompt identifier of the second service is triggered, switching the information prompt interface to a service reserving interface, and presenting a reserving operation identifier of the second service on the service reserving interface;

detecting that the reserving operation identifier of the second service is triggered by the user of the computing device, obtaining a usage credential of the second service from the backend server of the third-party service provider; and presenting, based on the obtained usage credential, the second service on the service usage interface after having switched from the service reserving interface back to the service usage interface.

3. The method according to claim 1, wherein the method further includes:

carrying, by the information prompt identifier of the second service, a reserving operation identifier corresponding to the second service;

detecting that the reserving operation identifier of the second service is triggered by the user of the computing device;

in response to detecting that the reserving operation identifier of the second service is triggered, obtaining a usage credential of the second service from the backend server of third-party service provider; and presenting, based on the obtained usage credential, the second service on the service usage interface after having switched from a service reserving interface back to the service usage interface.

4. The method according to claim 1, wherein:

the updating the predefined services on the service usage interface, and presenting the information prompt identifier corresponding to the first service comprises:

stopping a presentation of the first service on the service usage interface, and presenting, in an original display area of the first service, the information prompt identifier corresponding to the first service; and the method further comprises:

presenting the information prompt identifier of the second service in the original display area of the first service, wherein the information prompt identifier of the second service carries a reserving operation identifier corresponding to the second service;

detecting that the reserving operation identifier of the second service is triggered; and in response to detecting that the reserving operation identifier of the second service is triggered by the user of the computing device:

obtaining a usage credential of the second service from the backend server of the third-party service provider; and presenting, based on the obtained usage credential, the second service in the original display area of the first service.

5. The method according to claim 1, wherein the updating the predefined services on the service usage interface comprises:

stopping a presentation of the first service on the service usage interface; and presenting the first service a second time on the service usage interface when the first service is successfully reserved the second time from the backend server of the third-party service provider.

6. The method according to claim 1, including:

detecting, on the service usage interface, an operation of selecting a service for use; and when it is detected that the first service is selected for use, switching the service usage interface to a usage credential interface, obtaining the usage credential of the first service, and presenting the user credential of the first service on the usage credential interface.

7. A service processing computing device, comprising:
one or more processors; and
memory storing instructions, the instructions, when executed by the one or more processors, cause the processors to perform operations comprising:

presenting, at the service processing computing device, predefined services using a service usage interface of a social networking application, wherein the computing device is associated with a user account of the social networking application and each of the predefined services is published by a respective public account of the social networking application subscribed by the user account;

obtaining, from a backend server of a third-party service provider that has a public account at the social networking application, notification information that a first service presented on the service usage interface has been used and a corresponding time and place of such usage;

in response to obtaining the notification information, updating the predefined services on the service usage interface, and presenting an information prompt identifier corresponding to the first service;

detecting that the information prompt identifier corresponding to the first service is triggered by a user of the computing device, and in response to detecting that the information prompt identifier corresponding to the first service is triggered, generating, at the computing device, a recommendation for a second service, the recommendation of the second service is based on the first service that has been used, wherein the second service and the first service are services of a same type and the second service is provided by a different service provider associated with another public account of the social networking application; and presenting the notification information that the first service has been used and an information prompt identifier of the second service, wherein the information prompt identifier of the second service is capable of prompting a user to add the second service to the service usage interface of the social networking application, wherein:

the presenting the notification information that the first service has been used and the information prompt identifier of the second service comprises:

switching the service usage interface to an information prompt interface; and presenting, on the information prompt interface, the notification information that the first service has been used and the information prompt identifier of the second service.

8. The computing device according to claim 7, wherein the operations further include:

carrying, by the information prompt identifier of the second service, description information corresponding to the second service, the feature description information being used to represent a feature of association between the second service and the first service;

detecting that the information prompt identifier of the second service is triggered by the user of the computing device;

in response to detecting that the information prompt identifier of the second service is triggered, switching the information prompt interface to a service reserving interface, and presenting a reserving operation identifier of the second service on the service reserving interface;

detecting that the reserving operation identifier of the second service is triggered by the user of the computing device, obtaining a usage credential of the second service from the backend server of the third-party service provider; and presenting, based on the obtained usage credential, the second service on the service usage interface after having switched from the service reserving interface back to the service usage interface.

9. The computing device according to claim 7, wherein the operations further include:

carrying, by the information prompt identifier of the second service, a reserving operation identifier corresponding to the second service;

detecting that the reserving operation identifier of the second service is triggered by the user of the computing device;

in response to detecting that the reserving operation identifier of the second service is triggered, obtaining a usage credential of the second service from the backend server of third-party service provider; and presenting, based on the obtained usage credential, the second service on the service usage interface after having switched from a service reserving interface back to the service usage interface.

10. The computing device according to claim 7, wherein:

the updating the predefined services on the service usage interface, and presenting the information prompt identifier corresponding to the first service comprises:

stopping a presentation of the first service on the service usage interface, and presenting, in an original display area of the first service, the information prompt identifier corresponding to the first service; and the operations further comprise:

presenting the information prompt identifier of the second service in the original display area of the first service, wherein the information prompt identifier of the second service carries a reserving operation identifier corresponding to the second service;

detecting that the reserving operation identifier of the second service is triggered; and in response to detecting that the reserving operation identifier of the second service is triggered by the user of the computing device:

obtaining a usage credential of the second service from the backend server of the third-party service provider; and presenting, based on the obtained usage credential, the second service in the original display area of the first service.

11. The computing device according to claim 7, wherein the updating the predefined services on the service usage interface comprises:

stopping a presentation of the first service on the service usage interface; and presenting the first service a second time on the service usage interface when the first service is successfully reserved the second time from the backend server of the third-party service provider.

12. The computing device according to claim 7, wherein the operations include:

detecting, on the service usage interface, an operation of selecting a service for use; and when it is detected that the first service is selected for use, switching the service usage interface to a usage credential interface, obtaining the usage credential of the first service, and presenting the user credential of the first service on the usage credential interface.

13. A non-transitory computer-readable storage medium storing instructions, wherein the instructions, when executed by one or more processors of a computing device, cause the computing device to perform operations comprising:

presenting, at a computing device having one or more processors and memory, predefined services using a service usage interface of a social networking application, wherein the computing device is associated with a user account of the social networking application and each of the predefined services is published by a respective public account of the social networking application subscribed by the user account;

obtaining, from a backend server of a third-party service provider that has a public account at the social networking application, notification information that a first service presented on the service usage interface has been used and a corresponding time and place of such usage;

in response to obtaining the notification information, updating the predefined services on the service usage interface, and presenting an information prompt identifier corresponding to the first service;

detecting that the information prompt identifier corresponding to the first service is triggered by a user of the computing device, and in response to detecting that the information prompt identifier corresponding to the first service is triggered, generating, at the computing device, a recommendation for a second service, the recommendation of the second service is based on the first service that has been used, wherein the second service and the first service are services of a same type and the second service is provided by a different service provider associated with another public account of the social networking application; and presenting the notification information that the first service has been used and an information prompt identifier of the second service, wherein the information prompt identifier of the second service is capable of prompting a user to add the second service to the service usage interface of the social networking application, wherein:

the presenting the notification information that the first service has been used and the information prompt identifier of the second service comprises:

switching the service usage interface to an information prompt interface; and presenting, on the information prompt interface, the notification information that the first service has been used and the information prompt identifier of the second service.

14. The computer-readable storage medium according to claim 13, wherein the operations further include:

carrying, by the information prompt identifier of the second service, description information corresponding to the second service, the feature description information being used to represent a feature of association between the second service and the first service;

detecting that the information prompt identifier of the second service is triggered by the user of the computing device;

in response to detecting that the information prompt identifier of the second service is triggered, switching the information prompt interface to a service reserving interface, and presenting a reserving operation identifier of the second service on the service reserving interface;

detecting that the reserving operation identifier of the second service is triggered by the user of the computing device, obtaining a usage credential of the second service from the backend server of the third-party service provider; and presenting, based on the obtained usage credential, the second service on the service usage interface after having switched from the service reserving interface back to the service usage interface.

15. The computer-readable storage medium according to claim 13, wherein the operations further include:

carrying, by the information prompt identifier of the second service, a reserving operation identifier corresponding to the second service;

detecting that the reserving operation identifier of the second service is triggered by the user of the computing device;

in response to detecting that the reserving operation identifier of the second service is triggered, obtaining a usage credential of the second service from the backend server of third-party service provider; and presenting, based on the obtained usage credential, the second service on the service usage interface after having switched from a service reserving interface back to the service usage interface.

16. The computer-readable storage medium according to claim 13, wherein:

the updating the predefined services on the service usage interface, and presenting the information prompt identifier corresponding to the first service comprises:

stopping a presentation of the first service on the service usage interface, and presenting, in an original display area of the first service, the information prompt identifier corresponding to the first service; and the operations further comprise:

presenting the information prompt identifier of the second service in the original display area of the first service, wherein the information prompt identifier of the second service carries a reserving operation identifier corresponding to the second service;

detecting that the reserving operation identifier of the second service is triggered;

in response to detecting that the reserving operation identifier of the second service is triggered by the user of the computing device:

obtaining a usage credential of the second service from the backend server of the third-party service provider; and presenting, based on the obtained usage credential, the second service in the original display area of the first service.

17. The computer-readable storage medium according to claim 13, wherein the updating the predefined services on the service usage interface comprises:

stopping a presentation of the first service on the service usage interface; and presenting the first service the second time on the service usage interface when the first service is successfully reserved the second time from the backend server of the third-party service provider.

* * * * *